United States Patent [19]
Erdman et al.

[11] Patent Number: 5,646,491
[45] Date of Patent: Jul. 8, 1997

[54] ELECTRICAL MOTOR WITH A DIFFERENTIAL PHASE BACK EMF SENSING CIRCUIT FOR SENSING ROTOR POSITION

[75] Inventors: David M. Erdman; James A. Beatty, both of Fort Wayne, Ind.

[73] Assignee: General Electric Company, Fort Wayne, Ind.

[21] Appl. No.: 439,580

[22] Filed: May 11, 1995

[51] Int. Cl.$^6$ .................................................. H02P 7/00
[52] U.S. Cl. ............................................ 318/254; 318/439
[58] Field of Search .................................. 318/254, 138, 318/439

[56] References Cited

U.S. PATENT DOCUMENTS

| | | | |
|---|---|---|---|
| 4,162,435 | 7/1979 | Wright | 318/138 |
| 4,390,826 | 6/1983 | Erdman et al. | 318/439 |
| 4,449,079 | 5/1984 | Erdman | 318/138 |
| 4,491,772 | 1/1985 | Bitting | 318/254 |
| 4,494,055 | 1/1985 | Bitting et al. | 318/254 |
| 4,499,408 | 2/1985 | Bitting et al. | 318/254 |
| 4,500,821 | 2/1985 | Bitting et al. | 318/254 |
| 4,513,230 | 4/1985 | Erdman | 318/254 |
| 4,532,459 | 7/1985 | Erdman et al. | 318/138 |
| 4,642,537 | 2/1987 | Young | 318/254 |
| 4,651,069 | 3/1987 | Pellegrini | 318/254 |
| 4,757,241 | 7/1988 | Young | 318/254 |
| 4,862,044 | 8/1989 | Karashima et al. | 318/254 |
| 5,023,527 | 6/1991 | Erdman et al. | 318/254 |
| 5,367,234 | 11/1994 | DiTucci | 318/254 |
| 5,384,527 | 1/1995 | Rozman et al. | 318/254 X |

*Primary Examiner*—Jonathan Wysocki
*Attorney, Agent, or Firm*—Ralph E. Krisher, Jr.

[57] ABSTRACT

A motor having a differential phase back EMF sensing circuit for sensing rotor position includes a stationary assembly with at least three windings. The rotation of the rotor induces a back EMF in the windings. A control circuit energizes each of the windings with a current according to a preselected sequence. A switch network is coupled to the windings and provides two back EMF signals as a function of the back EMF induced in two of the windings when the control circuit is energizing the third winding. A signal processor is coupled to the switch network and produces a difference signal representative of a difference between the two back EMF signals. An integrator integrates the difference signal to produce an integrated difference signal. The motor includes a reference signal generator which produces a reference signal and a comparator which produces a trigger signal when the integrated difference signal exceeds the reference signal. The motor also includes a one shot which produces a position signal as a function of the trigger signal and a position counter which produces a position count signal as a function of the position signal. The control circuit energizes each of the windings according to the preselected sequence as a function of the position count signal. Other circuits and methods control the motor. The trigger signal may be generated in response to a zero crossing detector and timer.

37 Claims, 4 Drawing Sheets

FIG_3

ELECTRICAL MOTOR WITH A DIFFERENTIAL PHASE BACK EMF SENSING CIRCUIT FOR SENSING ROTOR POSITION

BACKGROUND OF THE INVENTION

The invention generally relates to electronically controlled motors and, in particular, to commutating windings of such motors in response to a back EMF signal in the windings of such motors.

The back EMF signal inducted in an unused winding of a multiphase electric motor may be used to control commutation of another winding. For example, in a three phase electronically commutated motor, the back EMF signal in an unused winding may be used to turn off one winding and to turn on the other winding. The winding most recently turned off then becomes the unused winding so that its back EMF signal is used to turn on the next winding and turn off the other winding. The process repeats as the rotor rotates. For example, see co-assigned, co-invented U.S. Pat. Nos. 4,390,826; 4,449,079; 4,513,230; and 4,532,459; the entire disclosures of which are incorporated herein by reference.

In practice, a common technique is to integrate the back EMF signal in the unused winding relative to the motor neutral in order to produce the firing signal for turning on the next winding. A problem with this technique in electronically commutated motors, however, is that it is susceptible to integrator offsets, i.e., rotor position error, during operation of the motor at low speeds. These offsets are caused by mutually coupled switching noise from the energized winding. The integrator offsets can be large enough to cause starting problems.

SUMMARY OF THE INVENTION

Among the objects of the present invention are to provide improved electrical motors which are reliable, durable and compact; to provide improved electrical motors which start smoothly and reliably; to provide improved electrical motors which operate smoothly at slow speeds; to provide improved electrical motors which operate with a minimum of rotor position error; to provide improved electrical motors which cancel the noise in the back EMF signal prior to sensing rotor position; and to provide improved electrical motors which are inexpensive to manufacture and efficient to operate.

Generally, one aspect of the invention is a motor including a stationary assembly and a rotatable assembly in magnetic coupling relation thereto. The stationary assembly includes at least three windings. The rotation of the rotatable assembly induces a back EMF in the windings. A control circuit is adapted to be coupled to a power supply. The control circuit energizes each of the windings with a current according to a preselected sequence. A switch network is coupled to the windings and provides two back EMF signals as a function of the back EMF induced in two of the windings when the control circuit is energizing the third winding. A signal processor is coupled to the switch network and produces a difference signal representative of a difference between the two back EMF signals. The control circuit is responsive to the signal processor and energizes each of the windings according to the preselected sequence as a function of the difference signal.

Another aspect of the invention is a motor including a stationary assembly and a rotatable assembly in magnetic coupling relation thereto. The stationary assembly includes at least three windings. The rotation of the rotatable assembly induces a back EMF in the windings. A control circuit is adapted to be coupled to a power supply. The control circuit energizes each of the windings with a current according to a preselected sequence. The motor also includes a positive terminal, a negative terminal and an open terminal. A switch network separately couples each of the windings to the positive terminal during a first period beginning when the back EMF induced in the winding is at a negative voltage and continuing while the back EMF is increasing from the negative voltage to a positive voltage. The switch network separately couples each of the windings to the negative terminal during a second period beginning when the back EMF induced in the winding is at a positive voltage and continuing while the back EMF is decreasing from the positive voltage to a negative voltage. The switch network separately couples each of the windings to the open terminal during a third period when the control circuit energizes the winding while the back EMF induced in the winding is a negative voltage and decreasing and continuing for a period of time while the back EMF remains at a negative voltage. A signal processor is coupled to the positive terminal and the negative terminal and produces a difference signal representative of a difference between the back EMF signal appearing at the positive terminal and the back EMF signal appearing at the negative terminal. The control circuit is responsive to the signal processor and energizes each of the windings according to the preselected sequence as a function of the difference signal.

A still further aspect of the invention is a method of controlling a motor wherein the motor includes a rotatable assembly and at least three windings. The rotation of the rotatable assembly induces a back EMF in the windings. The motor also includes a control circuit which energizes each of the windings with a current according to a preselected sequence. The method includes the steps of sensing two back EMF signals as a function of the back EMF induced in two of the windings when the control circuit is energizing the third winding. The method also includes the step of producing a difference signal representative of a difference between the two back EMF signals. The method also includes the step of energizing each of the windings according to the preselected sequence as a function of the difference signal.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF PREFERRED EMBODIMENTS

Figure 1:
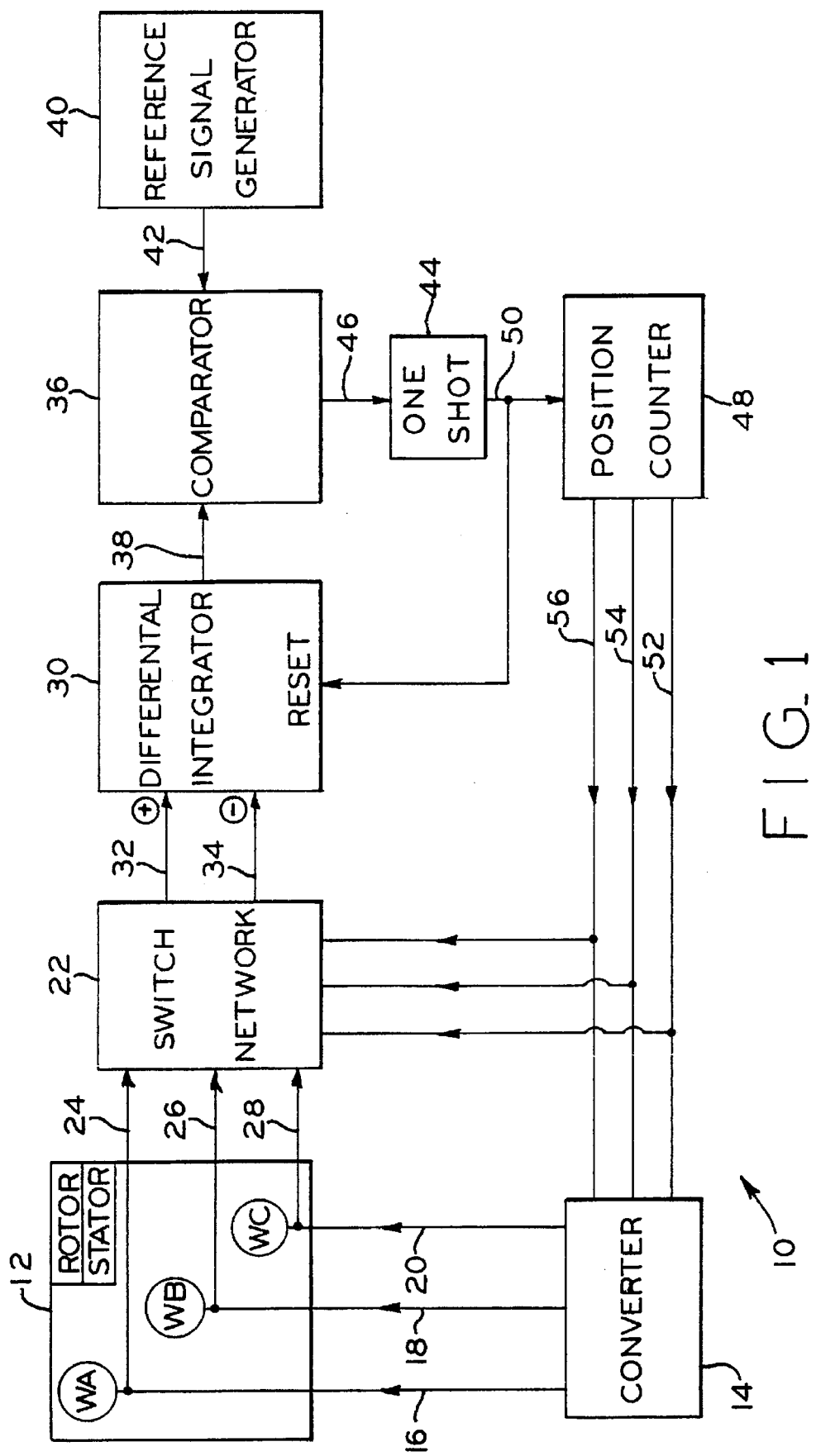
FIG. 1 illustrates a block diagram for a differential back EMF control circuit of the present invention.

FIG. 1 shows a circuit generally indicated at reference number 10 for controlling an electric motor 12 according to the present invention. Motor 12 may be any electronically controllable motor typically powered by an electronic commutating circuit. Such motors include single and variable speed motors, selectable speed motors having a plurality of finite, discrete speeds and brushless dc motors, including electronically commutated motors and switched reluctance motors. In addition, the motors may have a single split phase winding or a multiphase winding. Motor 12 may also provide finite, discrete rotor speeds selected by an electrical switch or the like. In FIG. 1, motor 12 is shown as a conventional electrical motor including a rotatable assembly (rotor) in magnetic coupling relation to a stationary assembly (stator) having three windings WA, WB and WC.

Circuit 10 includes a converter 14 for separately energizing windings WA, WB and WC via lines 16, 18 and 20, respectively. A switch network 22 receives the back EMF signals produced in windings WA, WB and WC during operation of motor 12 via lines 24, 26 and 28, respectively. During periods when one of the three windings is energized by converter 14, switch network 22 outputs the back EMF signals from the other two windings to a differential integrator 30 via lines 32 and 34. Differential integrator 30 subtracts the back EMF signal appearing on line 34 from the back EMF signal appearing on line 32 and integrates this difference signal to produce an integrated difference signal which is output to a comparator 36 via a line 38.

Comparator 36 receives a reference level signal from a reference signal generator 40 via a line 42. Comparator 36 compares the reference level signal with the integrated difference signal output by differential integrator 30. When the integrated difference signal is greater than the reference level signal, comparator 36 outputs a trigger signal to the one shot 44 via a line 46. One shot 44 responds to the trigger signal from comparator 36 by outputting a position signal to a position counter 48 and to a reset terminal of differential integrator 30 via a line 50. The occurrence of the position signal causes differential integrator 30 to reset so that it is ready to perform a new integration upon the signals next appearing over lines 32 and 34. The occurrence of the position signal also causes position counter 48 to increment its position count over lines 52, 54 and 56. The position count is the "high" signal which appears on one of the three lines, 52, 54 or 56. Each time the position count is incremented, position counter 48 moves the "high" signal to the next succeeding line.

Lines 52, 54 and 56 are connected to converter 14 and switch network 22. Lines 52, 54 and 56 correspond respectively to lines 16, 18 and 20 and to windings WA, WB and WC. Accordingly, when position counter 48 sets a high signal on line 52, converter 14 energizes winding WA. When position counter 48 sets a high signal on line 54, converter 15 energizes winding WB. When position counter 48 sets a high signal on line 56, converter 14 energizes winding WC.

Switch network 22 is also responsive to position counter 48. When a high signal is present on line 52, indicating that winding WA is being energized, switch network 22 applies the back EMF signals produced by windings WB and WC to differential integrator 30 via lines 34 and 32, respectively. Likewise, when a high signal is present on line 54 indicating that winding WB is being energized, switch network 22 outputs the back EMF signals produced by windings WA and WC to differential integrator 30 via lines 32 and 34, respectively. When a high signal is present on line 56 indicating that winding WC is being energized, switch network 22 outputs the back EMF signals produced by windings WA and WB to differential integrator 30 via lines 34 and 32, respectively.

Figure 2:
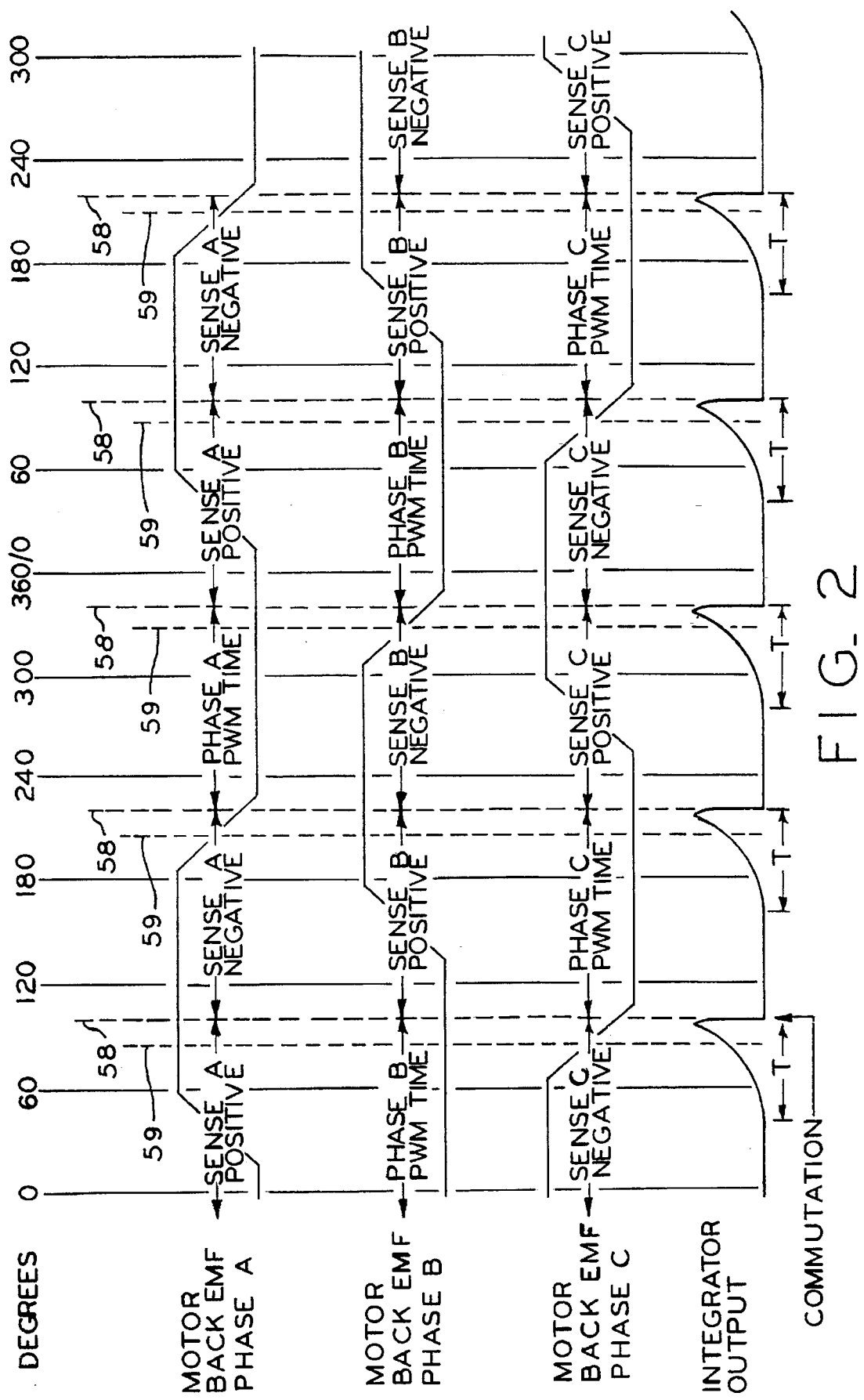
FIG. 2 illustrates a timing diagram for energizing the windings and for differentially sensing the back EMF in a three phase motor according to the invention.

FIG. 2 shows the back EMF wave forms for a three phase salient pole electronically commutated motor. Each of the three back EMF wave forms for the three windings have been partitioned into three 120° segments. These segments are named sense positive, sense negative and PWM time. The PWM time is the duration when a particular winding is energized to produce motor torque. During the sense positive and sense negative segments, the motor windings are not energized and are used to sense the position of the rotor. When a particular winding is passing through the sense positive time, it is connected to line 32 which is the non-inverting input of differential integrator 30. When a winding is passing through the sense negative segment, it is connected to line 34 which is the inverting input of differential integrator 30. At all times, there is one sense positive winding, one sense negative winding, and one energized winding. The mutual noise which appears during the sense positive portion of one winding will also appear in the sense negative portion of the other unused winding. The differential measurement technique subtracts the back EMF in the sense negative winding from the back EMF in the sense positive winding and integrates the result. During the subtraction process, the mutual noise which appears in both windings is eliminated leaving only the true back EMF signal to be integrated.

More particularly, FIG. 2 shows a timing diagram for the operation of switch network 22, differential integrator 30 and comparator 36. In particular, the numbers 0 through 360/0 across the top of the diagram labeled "Degrees" show the electrical degrees of the rotor during rotation. The wave form corresponding to "Motor Back EMF-Phase A" shows the back EMF signal produced by winding WA and also shows the pulse width modulation signal when winding WA is energized. Likewise, the wave form corresponding to "Motor Back EMF-Phase B" shows the back EMF signal produced by winding WB and also shows the pulse width modulation signal when winding WB is energized. Likewise, the wave diagram corresponding to "Motor Back EMF-Phase C" shows the back EMF signal produced by winding WC and also shows the pulse width modulation signal when winding WC is energized. The wave form corresponding to "Integrator Output" shows the output of differential integrator 30. The dashed lines corresponding to reference number 58 show the rotor position where comparator 36 determines that the output of differential integrator 30 is greater than the reference signal from reference signal generator 40 so that comparator 36 outputs the trigger signal to commence commutation of the next winding to be energized. A dashed line 59 corresponds to an advancement in the commutation of the windings of about 10 degrees. This advancement is desirable for higher speed operation of motor 12. This advancement may be accomplished, for example, by suitably varying the reference level signal output by reference signal generator 40.

As shown in FIG. 2, during periods of time when winding WA is energized, switch network 22 outputs the back EMF signal produced by winding WB over line 34 and outputs the back EMF signal produced by winding WC over line 32. Differential integrator 30 responds by subtracting the back EMF signal produced by winding WB from the back EMF signal produced by winding WC and by integrating the result which is output to comparator 36 via line 38. When this integration produces a sufficiently large signal to exceed the reference level signal output by reference signal generator 40 as indicated by lines 58 in FIG. 2, one shot 44 outputs the position signal causing position counter 48 to output a high signal on line 54. Converter 14 responds by energizing winding WB and deenergizing winding WA.

As also shown in FIG. 2, during periods of time when winding WB is energized, switch network 22 outputs the back EMF signal produced by winding WA over line 32 and outputs the back EMF signal produced by winding WC over line 34. Differential integrator 30 responds by subtracting the back EMF signal produced by winding WC from the back EMF signal produced by winding WA and by integrating the result which is output to comparator 36 via line 38. When this integration produces a sufficiently large signal to exceed the reference level signal output by reference signal generator 40 as indicated by lines 58 in FIG. 2, one shot 44 outputs the position signal causing position counter 48 to output a high signal on line 54. Converter 14 responds by energizing winding WC and deenergizing winding WB.

As also shown in FIG. 2, during periods of time when winding WC is energized, switch network 22 outputs the back EMF signal produced by winding WA over line 34 and outputs the back EMF signal produced by winding WB over line 32. Differential integrator 30 responds by subtracting the back EMF signal produced by winding WA from the back EMF signal produced by winding WB and by integrating the result which is output to comparator 36 via line 38. When this integration produces a sufficiently large signal to exceed the reference level signal output by reference signal generator 40 as indicated by lines 58 in FIG. 2, one shot 44 outputs the position signal causing position counter 48 to output a high signal on line 54. Converter 14 responds by energizing winding WA and deenergizing winding WC.

Accordingly, switch network 22 connects two of the motor windings to differential integrator 30 at all times. One of the windings is connected to the inverting or sense negative input and the other winding is connected to the non-inverting or sense positive input. The other winding is energized. Differential integrator 30 integrates the difference between the back EMFs of the two selected motor windings. By integrating the difference, the mutually coupled noise from the energized winding is cancelled. The output of differential integrator 30 is a voltage representative of the angular position of the rotor. The output of differential integrator 30 is compared to the reference level signal from reference signal generator 40. The reference level signal represents the angle of desired commutation of the motor. Comparator 36 outputs the trigger signal each time the desired angle of commutation is reached. The trigger signal is conditioned by one shot 440 one shot 44 provides proper timing for resetting differential integrator 30 and for clocking position counter 48. Position counter 48 performs two tasks. It provides the appropriate timing signal to switch network 22 and it also provides the timing signal for converter 14 so that the windings are energized in the proper order. Each time the commutation pulse is produced by one shot 44, position counter 48 advances to the next stage. Thus, converter 14, comparator 36, reference signal generator 40, one shot 44, position counter 48, and the integrating circuity within differential integrators 38 may be collectively considered one form of a control circuit which is responsive to the difference between the back EMF signals induced in the two unused windings for energizing each of the windings according to the preselected sequence.

Figure 3:
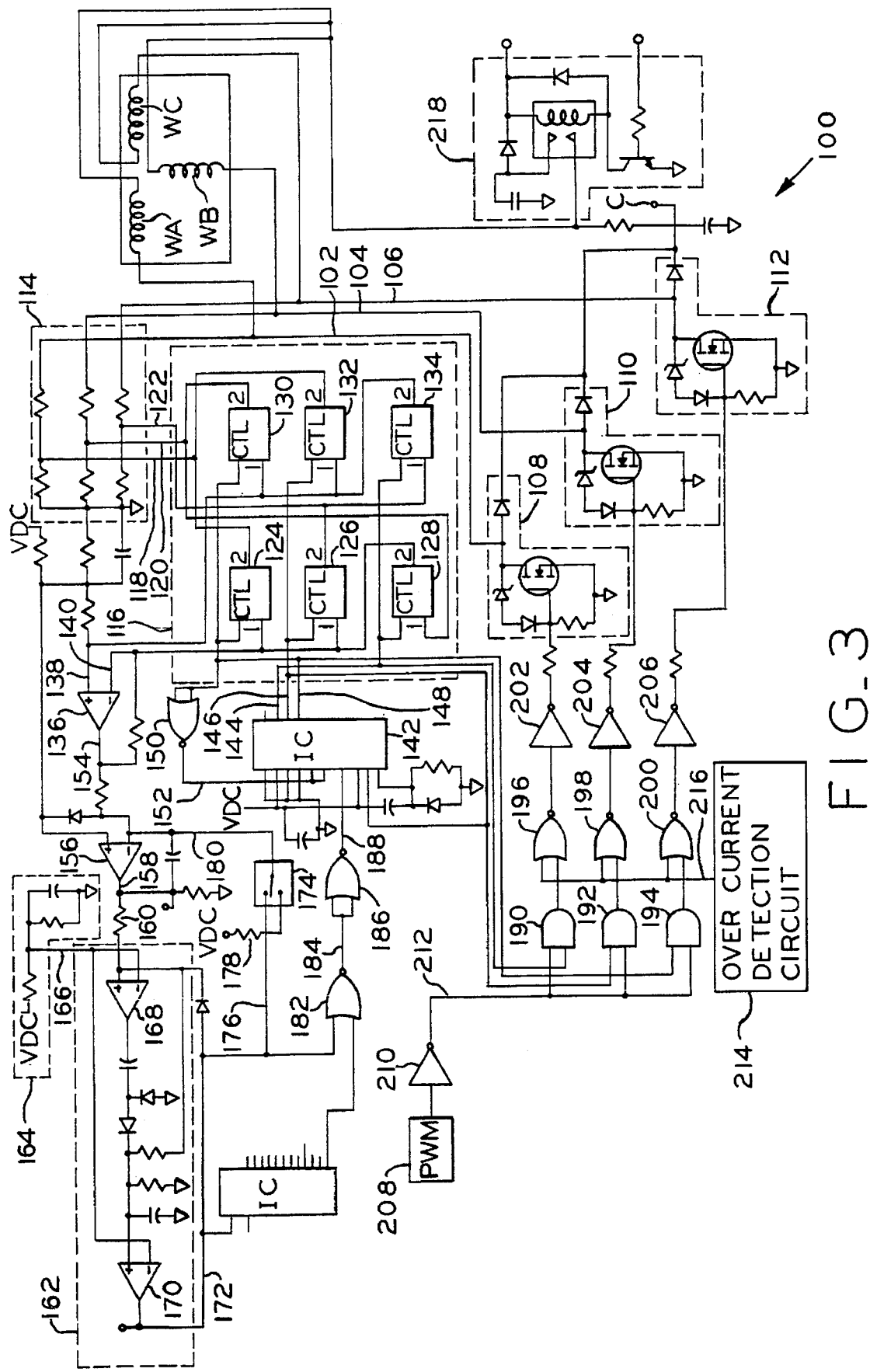
FIG. 3 illustrates a circuit diagram for implementing the block diagram of FIG. 1.

FIG. 3 shows a schematic diagram for an automotive blower motor control which uses the differential phase integration technique shown in FIGS. 1 and 2. In particular, FIG. 3 shows windings WA, WB and WC which are energized to rotate a rotor (not shown) in the motor. A control circuit 100 controls the energization of the windings. Windings WA, WB and WC are separately connected to lines 102, 104 and 106, respectively, for energizing the windings and for sensing the back EMF signals produced by the windings. Electrical power for energizing the windings is supplied to a central tap C which is connected to one end of each of the windings. The other end of windings WA, WB and WC is connected to transistor circuits 108, 110 and 112, respectively. When each of said transistor circuits is rendered conductive, electricity flows from central tap C, through the respective winding, and then through the respective transistor circuit back to ground to thereby energize the particular winding. Control of transistor circuits 108, 110 and 112 is described more fully below.

Circuit 100 includes a voltage dividing resistor circuit 114 which is separately connected to lines 102, 104 and 106 for scaling the back EMF signals appearing on said lines to appropriate voltage levels for further processing by circuit 100. The output of voltage dividing resistor network 114 is input to a switch network 116 via lines 118, 120 and 122. It will be seen that the scaled signal appearing on line 118 corresponds to the back EMF signal produced by winding WA, the scaled signal appearing on line 120 corresponds to the back EMF signal produced by winding WB, and the scaled signal appearing on line 122 corresponds to the back EMF signal produced by winding WC. During periods of time when each particular winding is energized, the scaled signal appearing on the corresponding line is not used by circuit 100.

Switch network 116 includes separate switch elements 124, 126, 128, 130, 132 and 134. Each of switch elements 124 through 134 has a terminal 1, a terminal 2 and a control terminal CTL. When a "high" signal is applied to the control terminal CTL, the particular switch element makes electrical connection between the particular terminal 1 and terminal 2 of said switch element. For example, when a high signal is applied to terminal CTL of switch element 124, terminal 1 of switch element 124 is electrically connected to terminal 2 of switch element 124.

Line 118 is connected to terminal 2 of switch element 124 and to terminal 2 of switch element 132. Line 120 is connected to terminal 1 of switch element 128 and to terminal 2 of switch element 130. Line 122 is connected to terminal 2 of switch element 126 and to terminal 1 of switch element 134. A differentiator 136 is also connected to switch network 116 via lines 138 and 140. Line 138 is connected to the non-inverting terminal of differentiator 136 and line 140 is connected to the inverting terminal of differentiator 136. Line 138 is also connected to terminal 1 of switch element 130, terminal 1 of switch element 132, and terminal 2 of switch element 134. Line 140 is also connected to terminal 1 of switch element 124, terminal 1 of switch element 126, and terminal 2 of switch element 128. Differentiator 136 is thereby selectively connected for taking the difference between the appropriate scaled back EMF signals produced by windings WA, WB and WC. The decision as to which scaled back EMF signals are supplied to the input terminals of differentiator 136 is controlled by a position counting IC 142.

Position counting IC 142 has three output lines 144, 146 and 148. Position counting IC 144 sequentially outputs a high signal on line 144, then on line 146, then on line 148. When the high signal is output on line 148, a NOR gate 150 has a low output which is connected back to position counting IC 142 via a line 152 which resets position counting IC 142 to output the next high signal on line 144.

Line 144 is connected to terminal CTL of switch elements 128 and 134. Line 146 is connected to terminal CTL of switch elements 126 and 132. Line 148 is connected to terminal CTL of switch elements 124 and 130. Position counting IC 142 thereby controls switch elements 124 through 134 to control which scaled back EMF signals are applied to the inputs of differentiator 136. Accordingly, when position counting IC 142 outputs a high signal on line 144, differentiator 136 subtracts the scaled back EMF signal produced by winding WB from the scaled back EMF signal produced by winding WC and outputs the difference on a line 154. When position counting IC 142 outputs a high signal on line 146, differentiator 136 subtracts the scaled back EMF signal produced by winding WC from the scaled back EMF signal produced by winding WA and outputs the difference on line 154. When position counting IC 142 outputs a high signal on line 148, differentiator 136 subtracts the scaled back EMF signal produced by winding WA from the scaled back EMF signal produced by winding WB and outputs the difference on line 154.

Integrator 156 receives the difference signal output by differentiator 136 via line 154 and the intervening circuit components shown in FIG. 3. Integrator 156 integrates the difference signal and outputs an integrated signal via a line 158 and a resistor 160 to a one shot 162. One shot 162 is also connected to a reference signal generator 164. Reference signal generator 164 includes resistors and a capacitor for dividing the voltage produced by the main voltage supply to produce a reference level signal on a line 166. One shot 162 compares the reference level signal on line 166 with the integrated signal output by integrator 156 via a comparator 168. When the integrated signal exceeds the reference level signal, comparator 168 produces an output signal which causes a comparator 170 to produce a one shot output signal on a line 172.

The one shot output signal on line 172 is connected to a control terminal of a switch element 174 via a line 176. The one shot output signal causes switch element 174 to connect the voltage level of the main voltage supply via a resistor 178 to the inverting input of integrator 156 via a line 180. This causes integrator 156 to be reset to initial conditions for performing the next integration of the difference signal output by differentiator 136. The occurrence of the one shot output signal corresponds to the end of the period of energization for one winding and the beginning of a period of energization for the next winding. Accordingly, integrator 156 is reset so that it can perform an integration of the back EMF signals produced by the two windings which will not be energized during the next commutation.

The one shot output signal is also received at an input of a NOR gate 182. NOR gate 182 responds by outputting a low signal on a line 184 which is received by a NOR gate 186. NOR gate 186 responds by outputting a high signal on a line 188 which is connected to the clock input of position counting IC 142. This clocks position counting IC 142 so that it increments its position count by moving the high signal from one of lines 144, 146 or 148 to the next succeeding line in sequence.

Lines 144, 146 and 148 are also connected to an input of AND gates 190, 192 and 194, respectively. The outputs of AND gates 190, 192 and 194 are separately connected to an input of NOR gates 196, 198 and 200, respectively, which are in turn connected to the inputs of inverters 202, 204 and 206, respectively. The outputs of inverters 202, 204 and 206 control the conductivity of transistor circuits 108, 110 and 112, respectively. When one of these inverters has a "high" output, the corresponding transistor circuit is rendered conductive which causes the corresponding winding WA, WB or WC to be energized. Accordingly, when position counting IC 142 outputs a high signal on line 144, winding WA is energized. When position counting IC 142 outputs a high signal on 146, winding WB is energized. When position counting IC 142 outputs a high signal on line 148, winding WC is energized.

It will be seen, therefore, that position counting IC controls the particular winding WA, WB or WC which is to be energized via transistor circuits 108, 110 and 112, respectively, and also controls the connection of the back EMF signals produced by the deenergized windings to the input terminals of differentiator 136. The difference signal output by differentiator 136 is then integrated by integrator 156 to produce an integrated signal. Comparator 168 of one shot 162 then compares the integrated signal against a reference level signal from reference signal generator 164. When the integrated signal exceeds the reference level signal, one shot 162 outputs a one shot signal via line 172 which resets integrator 156 and which also increments position counting IC 142 to move the high output signal from one of lines 144, 146 or 148 to the next succeeding line.

Circuit 100 also includes a pulse width modulating circuit 208 which is connected to an input of AND gates 190, 192 and 194 via an inverter 210 and a line 212. Pulse width modulating circuit 208 pulse width modulates the electricity supplied to windings WA, WB and WC during each of said windings respective energization periods. The structure, operation and connection of pulse width modulating circuit 208 are commonly understood by those skilled in the art and are not further described herein. Pulse width modulating circuit 208 is also connected to a circuit 218 (connection not shown) for sensing the current level in windings WA, WB and WC, respectively.

Circuit 100 also includes an overcurrent detection circuit 214. Overcurrent detection circuit 214 is of particular use in an automobile where sudden changes in the power supplied for operating circuit 100 can occur. For example, if the battery in the automobile is receiving a substantial charging current when a cable to the battery is suddenly disconnected, a very powerful surge of electricity will be received at the power input to circuit 100. This excess surge of electricity will be detected by overcurrent detection circuit 214 which will respond by outputting a high signal on a line 216. Line 216 is connected to an input of NOR gates 196, 198 and 200 which will cause each of them to output a low signal. The low signal output by said NOR gates will cause each of inverters 202, 204 and 206 to output a high signal which will render each of transistor circuits 108, 110 and 112 conductive. This will cause all of windings WA, WB and WC to be energized at the same time to help dissipate the excess current produced by the current surge. This may cause a disruption in the rotation of the rotor of the motor; however, it will assist in the safe dissipation of the excess current.

Figure 4:
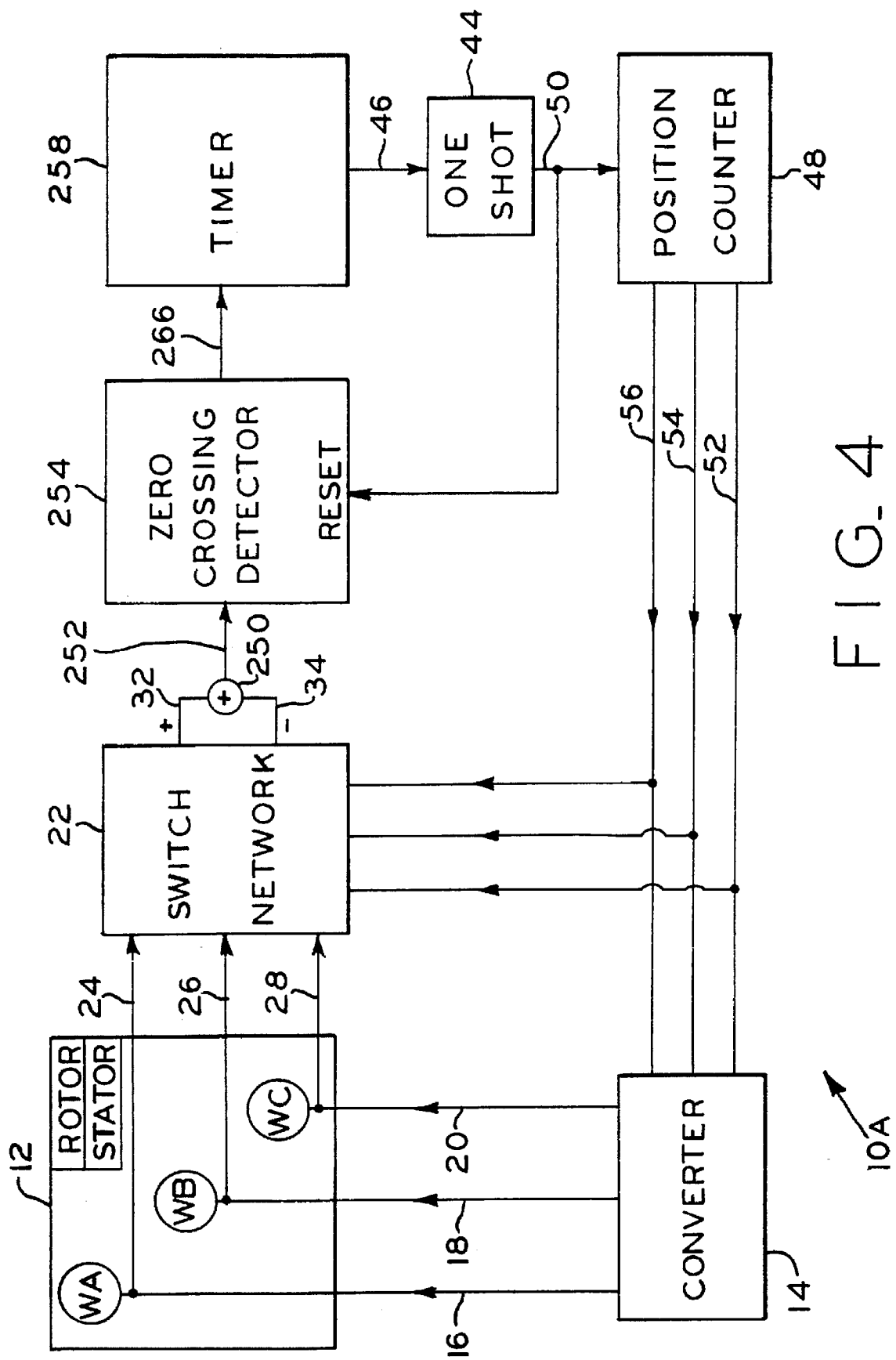
FIG. 4 illustrates a block diagram for another preferred embodiment for a differential back EMF control circuit of the present invention.

In another preferred embodiment illustrated in FIG. 4, a circuit 10A includes the motor 12, converter 14, switch network 22, one shot 44 and position counter 48 as shown in FIG. 1. Instead of integrator 30 and comparator 36 to provide the trigger signal to one shot 44 via line 46, circuit 10A evaluates the two back EMF signals provided via lines 32 and 34. An adder 250 combines the back EMF signals appearing on lines 32 and 34 to provide a sum signal via line 252 representative of the difference between the back EMF signals of the two unenergized windings.

A zero crossing detector 254 receives the sum signal from adder 250 and outputs a zero crossing detect signal via line 256 to a timer 258 whenever the sum signal crosses from negative to positive or positive to negative. Timer 258 is set to time out a period of time T representative of an average period of time from the zero crossing to the next commutation event. For example, period of time T may be an average of the integration time as illustrated in FIG. 2. When the period of time T has elapsed after the zero crossing, timer 258 generates a trigger signal to the one shot 44 via a line 46. One shot 44 responds to the trigger signal from the timer 258 by outputting the position signal to the position counter 48 and to a reset terminal of the zero crossing detector 254 via line 50. The occurrence of the position signal causes zero crossing detector 254 to reset so that it is ready to detect a new zero crossing of the sum signal. The remaining portion of FIG. 4 functions in the same manner as illustrated and described regarding FIG. 1.

Alternatively, differential integrator 30, comparator 36, generator 40, one shot 44, counter 48, zero crossing detector 254 and/or timer 258 may be implemented as or as part of a microprocessor which, in turn, provides the trigger signal to one shot 44 or the counter signals via lines 52, 54, 56. In addition, the microprocessor may dynamically determine the length of the period of time T based on various other parameters of the motor 12 such as speed or torque. Also, the period of time T may be calculated by an algorithm based on one or more motor parameters or may be determined as a average or mean of previous periods of time.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A motor comprising:

a stationary assembly and a rotatable assembly in magnetic coupling relation thereto, said stationary assembly including three windings, the rotation of said rotatable assembly inducing a back EMF in said windings;

a control circuit, for coupling to a power supply, for energizing each of the windings with a current according to a preselected sequence;

a switch network coupled to the each of the windings for providing two back EMF signals as a function of the back EMF induced in the remaining two of the windings when the control circuit is energizing said each winding; and a signal processor coupled to the switch network for producing a difference signal corresponding to each of the windings, each of the difference signals representative of a difference between the remaining two back EMF signals, the control circuit being responsive to the signal processor for energizing each of the windings according to the preselected sequence as a function of its corresponding difference signal.

2. The motor of claim 1 wherein the control circuit further comprises an integrator responsive to the signal processor for integrating each of the difference signals to produce an integrated difference signal corresponding to each of the difference signals; and wherein the control circuit is responsive to the integrator for energizing each of the windings according to the preselected sequence as a function of its corresponding integrated difference signal.

3. The motor of claim 2 wherein the control circuit further comprises:

a reference signal generator for producing a reference signal; and a comparator responsive to the integrator and the reference signal generator for producing a trigger signal as a function of and corresponding to each of the integrated difference signals and the reference signal;

wherein the control circuit is responsive to the comparator for energizing each of the windings according to the preselected sequence as a function of its corresponding trigger signal.

4. The motor of claim 3 wherein the comparator further comprises means for producing the trigger signal when its corresponding integrated difference signal exceeds the reference signal.

5. The motor of claim 3 wherein the integrator further comprises means for resetting the integrator as a function of the trigger signal.

6. The motor of claim 3 wherein the control circuit further comprises a one shot responsive to the comparator for producing a position signal as a function of and corresponding to each of the trigger signals;

wherein the integrator further comprises means for resetting the integrator as a function of the position signal; and wherein the control circuit is responsive to the one shot for energizing each of the windings according to the preselected sequence as a function of its corresponding position signal.

7. The motor of claim 6 wherein the control circuit further comprises a position counter responsive to the one shot for producing a position count signal as a function of and corresponding to each of the position signals; and wherein the control circuit is responsive to the position counter for energizing each of the windings according to the preselected sequence as a function of its corresponding position count signal.

8. The motor of claim 1 wherein the control circuit further comprises:

a reference signal generator for producing a reference signal; and a comparator responsive to the signal processor and the reference signal generator for producing a trigger signal as a function of and corresponding to each of the difference signals and the reference signal;

wherein the control circuit is responsive to the comparator for energizing each of the windings according to the preselected sequence as a function of its corresponding trigger signal.

9. The motor of claim 1 wherein the signal processor produces a zero crossing signal representative of and corresponding to a zero crossing of each of the difference signals, the control circuit being responsive to the signal processor for energizing each of the windings according to the preselected sequence as a function of its corresponding zero crossing signal.

10. The motor of claim 9 wherein the control circuit further comprises a timer responsive to the zero crossing signals of the signal processor for timing out a period of time to produce the trigger signals and wherein the control circuit is responsive to the timer for energizing each of the windings according to the preselected sequence as a function of its corresponding trigger signal.

11. The motor of claim 10 wherein the zero crossing detector further comprises means for resetting the zero crossing detector as a function of the trigger signal.

12. The motor of claim 10 wherein the control circuit further comprises a one shot responsive to the timer for producing a position signal as a function of and corresponding to each of the trigger signals;

wherein the zero crossing detector further comprises means for resetting the zero crossing detector as a function of the position signal; and wherein the control circuit is responsive to the one shot for energizing each of the windings according to the preselected sequence as a function of its corresponding position signal.

13. The motor of claim 12 wherein the control circuit further comprises a position counter responsive to the one shot for producing a position count signal as a function of and corresponding to each of the position signals; and wherein the control circuit is responsive to the position counter for energizing each of the windings according to the preselected sequence as a function of its corresponding position count signal.

14. A motor comprising:

a stationary assembly and a rotatable assembly in magnetic coupling relation thereto, said stationary assembly including three windings, the rotation of said rotatable assembly inducing a back EMF in said windings;

a control circuit, for coupling to a power supply, for energizing each of the windings with a current according to a preselected sequence;

a positive terminal;

a negative terminal;

an open terminal;

a switch network for separately coupling each of the windings:

to the positive terminal during a first period beginning when the back EMF induced in said winding is at a negative voltage and continuing while said back EMF is increasing from the negative voltage to a positive voltage;

the negative terminal during a second period beginning when the back EMF induced in said winding is at a positive voltage and continuing while said back EMF is decreasing from the positive voltage to a negative voltage; and to the open terminal during a third period when the control circuit energizes said winding while the back EMF induced in said winding is a negative voltage and decreasing and continuing for a period of time while said back EMF remains at a negative voltage; and a signal processor coupled to the positive terminal and the negative terminal for producing a difference signal representative of a difference between the back EMF signal appearing at the positive terminal and the back EMF signal appearing at the negative terminal for each of the windings;

wherein the control circuit is responsive to the signal processor for energizing each of the windings according to the preselected sequence as a function of its corresponding difference signal.

15. The motor of claim 14 wherein the control circuit further comprises an integrator responsive to the signal processor for integrating the difference signal to produce a corresponding integrated difference signal for each of the windings; and wherein the control circuit is responsive to the integrator for energizing each of the windings according to the preselected sequence as a function of its corresponding integrated difference signal.

16. The motor of claim 15 wherein the control circuit further comprises:

a reference signal generator for producing a reference signal; and a comparator responsive to the integrator and the reference signal generator for producing a trigger signal as a function of and corresponding to each of the integrated difference signals and the reference signal;

wherein the control circuit is responsive to the comparator for energizing each of the windings according to the preselected sequence as a function of its corresponding trigger signal.

17. The motor of claim 16 wherein the comparator further comprises means for producing the trigger signal when its corresponding integrated difference signal exceeds the reference signal.

18. The motor of claim 16 wherein the integrator further comprises means for resetting the integrator as a function of the trigger signal.

19. The motor of claim 16 wherein the control circuit further comprises a one shot responsive to the comparator for producing a position signal as a function of and corresponding to each of the trigger signals;

wherein the integrator further comprises means for resetting the integrator as a function of the position signal; and wherein the control circuit is responsive to the one shot for energizing each of the windings according to the preselected sequence as a function of its corresponding position signal.

20. The motor of claim 19 wherein the control circuit further comprises a position counter responsive to the one shot for producing a position count signal as a function of and corresponding to each of the position signals; and wherein the control circuit is responsive to the position counter for energizing each of the windings according to the preselected sequence as a function of its corresponding position count signal.

21. The motor of claim 14 wherein the control circuit further comprises:

a reference signal generator for producing a reference signal; and a comparator responsive to the signal processor and the reference signal generator for producing a trigger signal as a function of and corresponding to each of the difference signals and the reference signal;

wherein the control circuit is responsive to the comparator for energizing each of the windings according to the preselected sequence as a function of its corresponding trigger signal.

22. The motor of claim 14 wherein the signal processor produces a zero crossing signal representative of a zero crossing of each of the difference signals wherein the control circuit is responsive to the signal processor for energizing each of the windings according to the preselected sequence as a function of its corresponding zero crossing signal.

23. A method of controlling a motor, the motor comprising a rotatable assembly and three windings, the rotation of said rotatable assembly inducing a back EMF in said windings, the motor further comprising a control circuit for energizing each of the windings with a current according to a preselected sequence; the method comprising the steps of:

sensing two back EMF signals for each winding as a function of the back EMF induced in the remaining two of the windings when the control circuit is energizing said each winding; and producing a difference signal for each winding representative of a difference between the remaining two back EMF signals; and energizing each of the windings according to the preselected sequence as a function of its corresponding difference signal.

24. The method of claim 23 further comprising the step of integrating each of the difference signals to produce a corresponding integrated difference signal for each of the windings; and wherein the energizing step further comprises the step of energizing each of the windings according to the preselected sequence as a function of its corresponding integrated difference signal.

25. The method of claim 24 further comprising the steps of:

producing a reference signal; and producing a trigger signal as a function of and corresponding to each of the integrated difference signals and the reference signal;

wherein the energizing step further comprises the step of energizing each of the windings according to the preselected sequence as a function of its corresponding trigger signal.

26. The method of claim 25 wherein the producing step further comprises the step of producing the trigger signal when its corresponding integrated difference signal exceeds the reference signal.

27. The method of claim 23 wherein the integrating step further comprises the step of resetting said step as a function of the trigger signal.

28. The method of claim 23 further comprising the step of producing a position signal as a function of and corresponding to each of the trigger signals;

wherein the integrating step further comprises the step of resetting said step as a function of the position signal; and wherein the energizing step further comprises the step of energizing each of the windings according to the preselected sequence as a function of its corresponding position signal.

29. The method of claim 28 further comprising the step of producing a position count signal as a function of and corresponding to each of the position signals; and wherein the energizing step further comprises the step of energizing each of the windings according to the preselected sequence as a function of its corresponding position count signal.

30. The method of claim 23 further comprising the steps of:

producing a reference signal; and producing a trigger signal as a function of and corresponding to each of the difference signals and the reference signal;

wherein the energizing step further comprises the step of energizing each of the windings according to the preselected sequence as a function of its corresponding trigger signal.

31. The method of claim 23 comprising:

producing a zero crossing signal representative of a zero crossing of each of the difference signals; and energizing each of the windings according to the preselected sequence as a function of its corresponding zero crossing signal.

32. The method of claim 31 further comprising the step of timing a period of time after each of the zero crossings and wherein the energizing step further comprises the step of energizing each of the windings according to the preselected sequence as a function of its corresponding period of time.

33. The method of claim 32 further comprising the steps of:

producing a trigger signal as a function of and corresponding to each of the zero crossing signals; and wherein the energizing step further comprises the step of energizing each of the windings according to the preselected sequence as a function of its corresponding trigger signal.

34. The method of claim 33 wherein the producing step further comprises the step of resetting said detecting step as a function of the trigger signal.

35. The method of claim 34 further comprising the step of producing a position signal as a function of and corresponding to each of the trigger signals;

wherein the detecting step further comprises the step of resetting said detecting step as a function of the position signal; and wherein the energizing step further comprises the step of energizing each of the windings according to the preselected sequence as a function of its corresponding position signal.

36. The method of claim 35 further comprising the step of producing a position count signal as a function of and corresponding to each of the position signals; and wherein the energizing step further comprises the step of energizing each of the windings according to the preselected sequence as a function of its corresponding position count signal.

37. The method of claim 31 further comprising the steps of:

producing a trigger signal as a function of and corresponding to each of the zero crossing signals; and wherein the energizing step further comprises the step of energizing each of the windings according to the preselected sequence as a function of its corresponding trigger signal.

* * * * *